United States Patent [19]

Keens

[11] Patent Number: 4,948,228

[45] Date of Patent: Aug. 14, 1990

[54] OPTICAL IMAGE ROTATORS

[75] Inventor: Andrew P. Keens, Middlesex, England

[73] Assignee: Thorn Emi plc, London, England

[21] Appl. No.: 239,993

[22] Filed: Sep. 2, 1988

[30] Foreign Application Priority Data

Sep. 5, 1987 [GB] United Kingdom ............... 8720923

[51] Int. Cl.[5] ........................... G02B 5/30; G02B 5/04
[52] U.S. Cl. .................................. 350/397; 350/166; 350/286
[58] Field of Search ............... 350/394, 397, 402, 486, 350/6.6, 286, 552, 164, 166

[56] References Cited

U.S. PATENT DOCUMENTS

| | | | |
|---|---|---|---|
| 2,147,615 | 2/1939 | Baroni | 350/286 |
| 4,209,224 | 6/1980 | Stewart, Jr. | 350/6.6 |
| 4,355,870 | 10/1982 | Orloff et al. | 350/486 |
| 4,509,830 | 4/1985 | Kato et al. | 350/394 |
| 4,514,047 | 4/1985 | Haskal et al. | 350/394 |
| 4,525,034 | 6/1985 | Simmons | 350/286 |
| 4,553,822 | 11/1985 | Mahlein | 350/394 |
| 4,556,292 | 12/1985 | Mathyssek et al. | 350/394 |
| 4,595,261 | 6/1986 | Baasch et al. | 350/394 |
| 4,641,926 | 2/1987 | Shirasaki | 350/394 |
| 4,657,356 | 4/1987 | Matsumura | 350/522 |

FOREIGN PATENT DOCUMENTS 0263656 4/1988 European Pat. Off. .

*Primary Examiner*—Bruce Y. Arnold
*Assistant Examiner*—Martin Lerner
*Attorney, Agent, or Firm*—Fleit, Jacobson, Cohn, Price, Holman & Stern

[57] ABSTRACT

An optical rotator such as a Pechan rotator is arranged to rotate an image about a given axis. Light entering an input surface of the rotator is subjected to a number (e.g. five) of reflections, alternate reflections being total internal reflections and the intervening ones being mirror reflections. At least one of the surfaces, preferably one at which total internal reflection occurs, bears a layered polarizing material arranged to impart a defined polarization effect as between light entering and exiting the rotator.

11 Claims, 2 Drawing Sheets

OPTICAL IMAGE ROTATORS

BACKGROUND OF THE INVENTION

1. Field of the Invention

The present invention is related to optical image rotators which are particularly, but not exclusively, suitable for use with multi-channel optical recording systems.

2. Description of the Related Art

Multi-channel optical tape recording systems utilising polarising reading optics are disclosed in our published European Patent Application No. 0263656 and British Patent Application No. 8720924. In such systems, an optical image rotator is disposed in the path of circularly polarised incident and reflected light beams. A preferred embodiment of rotator disclosed in the aforementioned European Patent Application is a modified form of Vee-block or Abbe rotator having only three metallised reflecting surfaces, and no totally internally reflecting surfaces, in order that the reflections within the rotator have a relatively small polarising effect on light passing through the rotator. While many rotators are optically suitable for use with circularly polarised light, they generally have the disadvantage that they are asymmetric about their axis of rotation, and hence, when rotating at high speed, suffer from dynamic mechanical unbalance. Furthermore, it may be shown that, for good optical performance, the minimum circumscribed diameter of an Abbe or Vee-block rotator about its axis of rotation should be at least double the width of its optical entrance aperture, and such a large circumscribed diameter may be disadvantageous if a compact optical system is required.

In contrast, a Pechan rotator is symmetrical about its axis of rotation and may operate satisfactorily with a considerably lower minimum circumscribed diameter relative to its optical entrance aperture. A Pechan rotator is therefore mechanically preferable to a Vee-block or an Abbe rotator. A conventional Pechan rotator, however has five reflecting surfaces in the optical path, three of which are totally internally reflecting (TIR), and the greater number of reflections would introduce undesirable polarisation effects to an incident circularly polarised light beam, giving rise to an unwanted cyclic amplitude modulation if used in an optical recording system which includes polarising replay optics.

It is an object of the present invention to provide an improved optical image rotator particularly suited for use with polarising optical systems.

SUMMARY OF THE INVENTION

In accordance with the present invention, one or more reflective faces of an optical rotator has layered polarising means thereby to produce a predetermined polarisation effect of the rotator between input and output of a light beam.

Preferably, the polarising means comprises a plurality of layers of optically transmissive thin films, for example of silicon oxide or magnesium fluoride.

The predetermined polarisation effect may be to provide a total phase retardation of 180° between the p and s polarisation components between a light beam input to the rotator and that beam upon output therefrom; other predetermined polarisation effects may be to provide a retardation of 0°, 90° or 270°.

Clearly, the present invention is also applicable to, and may be used with advantage in, optical systems which, prima facie, do not appear concerned with polarising optics. Thus for example, as a laser produces inherently polarised light, any optics system which uses a laser and requires a rotator will suffer from polarisation effects unless the present invention is used.

BRIEF DESCRIPTION OF THE DRAWINGS

The invention will now be described, by way of example, with reference to the accompanying drawings in which.

DESCRIPTION OF THE PREFERRED EMBODIMENT

Figure 1:
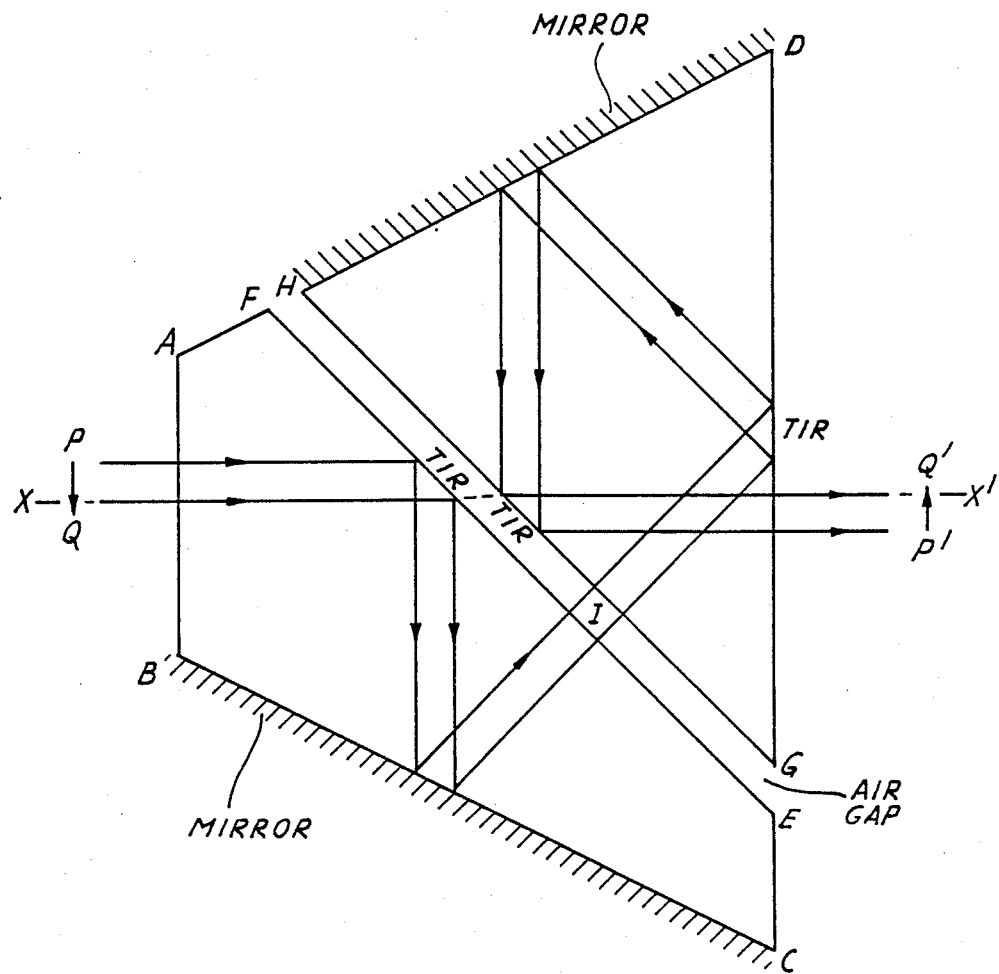
FIG. 1 is a side view of a Pechan optical rotator.

Referring to FIG. 1, a Pechan rotator rotates symmetrically about the axis XX', and would normally be fixed in or to a motor-driven hollow shaft (not shown) as described in our above mentioned Patent Applications. The light path rotator has the geometry of a conventional Pechan rotator as is disclosed, for example, in the published paper "Image Rotation Devices—A Comparative Survey" by D. W. Swift, Optics and Laser Technology, August 1972, pages 175 to 188. The rotator comprises two prisms ABCEF and HGD firmly fixed to one another with a small air gap between the adjoining diagonal planar faces FE and HG. The light entry and exit faces AB and DC respectively are each square in cross-section and perpendicular to the rotational axis XX', and a circular entrance aperture (not shown) would have a diameter equal to or less than the length of the side AB. The paths of an axial light beam QQ' and of a parallel non-axial light beam PP' both undergo total internal reflection (TIR) at the surfaces FE, DG and HG. The upper and lower planar surfaces HD and BC are metallised with, for example, evaporated silver to provide two mirror reflections in the path of each of the light beams. The total number of reflections for each beam is five and, since this is an odd number, an image such as P'Q' of a fixed object source PQ will rotate about the axis XX' at double the rotational speed of the rotator. The geometry of the prisms is designed such that the light beams cross the air gap between the mating parallel faces FE and HG with normal incidence in the region I. The mating faces FE and GH are inclined at 45° to the axis XX', while the metallised faces HD and BC are inclined at ±22.5° to the axis. The prisms are of an optical glass having, typically, a refractive index of the order of 1.76 for which the critical angle of incidence for total internal refraction is substantially 35°. Light is incident on the three faces FE, GH and DG at 45° and is totally internally reflected, with an angle of incidence of 45°, while light is incident on the two metallised faces HD and BC at 22.5° and is mirror reflected.

It is well known that the total internal reflection of light is normally accompanied by marked polarisation changes and phase retardations which would disturb the state of polarisation of an incident light beam, and that a metallized mirror reflection may exhibit a similar effect, but to a lesser extent. The total polarising effect of the five reflections is likely to be unacceptably high in a conventional Pechan rotator when required to operate with polarised light.

In this embodiment of the present invention, multiple layer optically transmissive thin films are deposited on to one or more of the optically reflecting faces on a rotator in a controlled manner such that a total phase retardation of substantially 180° occurs between the p and s polarisation components of light transmitted through the rotator.

A retardation of 180° rather than one of 0° retardation is chosen in order that the rotator may behave optically as a half-wave plate. A half-wave plate is known, when rotated, to rotate the plane of rotation of incident polarised light and, if an optical rotator has a total phase retardation of 180°, any polarisation of the incident light will rotate with the image rather than remain stationary, as would be the case with zero retardation.

The light path crossing the diagonally inclined faces FE and HG in the region I has normal incidence, and it is desirable that these surfaces should both be provided with coatings which are anti-reflective at normal incidence, while maintaining the constraint that the total phase retardation encountered in all five reflections is substantially 180°.

In a Pechan prism, the inherent polarisation effects in the prism may be corrected by applying three substantially identical multi-layer coatings to each of the totally internally reflecting surfaces, FE, GH and DE and no coatings to the two metallised surfaces. The desired correction of polarisation effects introduced by the five reflective surfaces associated with an overall 180° phase retardation and anti-reflective properties at normal incidence for each of the surfaces FE and HG may be achieved by applying to each of the three glass surfaces FE, HG and DG a multi-layer coating with layer properties substantially as follows:

| Layer | Thickness of Layer | Refractive Index of Layer |
|---|---|---|
| 1 | $\lambda/4$ | 1.86 |
| 2 | $\lambda/2$ | 1.76 |
| 3 | $\lambda/4$ | 1.50 |
| 4 | $\lambda/4$ | 1.62 |
| 5 | $\lambda/4$ | 1.51 | where $\lambda$ is the wavelength of light passing through the layer, and the refractive index figures for the layers apply for a glass refractive index of 1.76. The specified features provide a coating with an optimised flat-angle response characteristic, namely the required optical criteria are satisfied not only for the nominal angle but for a comparatively wide tolerance range (of the order of a few degrees). Clearly, by appropriate changing of the specified features, variations in the flat-angle response characteristics can be readily achieved while ensuring that the requirements at the nominal angle are still satisfied. There is a trade-off, or weighting, between optimisation for a wavelength range, or an angle range, the degree of variation acceptable in the phase response, the transmission of the system, and the total thickness of the multilayer film. In addition to varying the refractive indices, non-quarter wave layers may be used at the expense of the anti-reflection properties.

If different coatings are used then it is possible to obtain flat angle responses from each surface thus allowing for angular misalignments in the system. Furthermore, the greater number of variables can allow a more desirable coating to be designed.

Figures 2A, 2B:
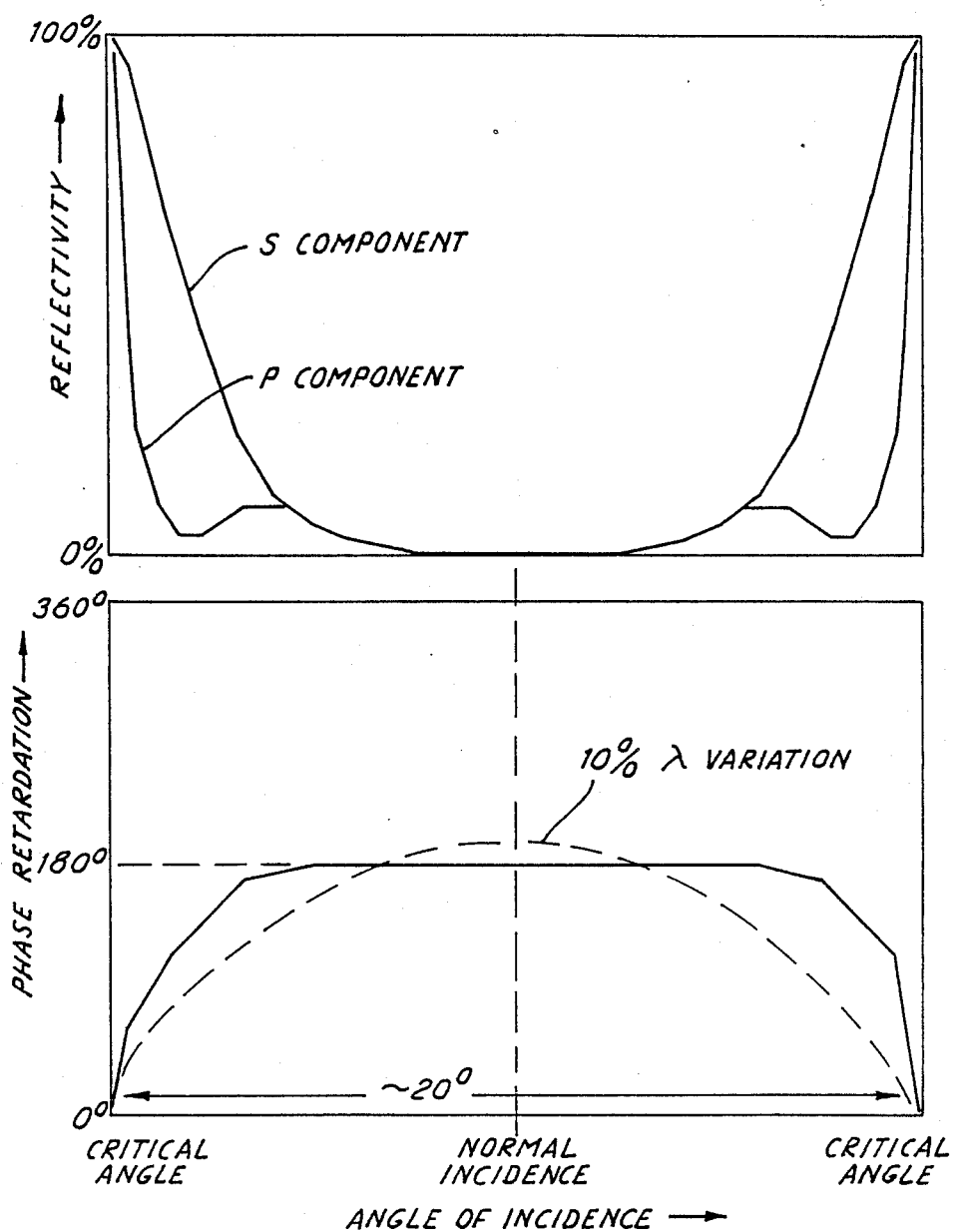
FIGS. 2A and 2B and graphical representation of reflectivity and phase retardation properties of a Pechan optical rotator according to the invention.

FIGS. 2A and 2B show overall typical examples of reflectivity and phase retardation for a Pechan prism having such coatings, plotted against the angle of incidence of an incoming light beam to the entry face AB. It is seen that, at normal incidence, the phase retardation is substantially 180° and that the overall reflectivity is very low.

It will be appreciated that the invention strictly applies to monochromatic light of wavelength $\lambda$, and if the wavelength is changed, the film thicknesses should, in theory, change proportionally. In practice, however, variations of up to the order of 10% $\lambda$ in for fixed film thicknesses are generally tolerable without causing unacceptable departures from the ideal reflectivity and phase response. As such, a Pechan rotator for use in a dual wavelength multi-beam optical recording system with polarising read optics could be satisfactory provided that the write and read beam wavelengths do not differ by more than the order of 10%.

The multiple layers may be deposited by such methods as evaporation or sputtering, and techniques for controlling their thickness are well-known. The films may be chosen from any known materials having refractive indices substantially as defined above. For wavelengths such as are generally used in optical recorders, in the order of 700 to 800 nm, the films may be all of a silicon oxide of general formula $SiO_x$ where x lies within the range 1 to 2. Each of the five films may be evaporated in turn from a SiO source, and the required refractive indices may be obtained by introducing varying amounts of oxygen into the evaporation chamber.

It will be apparent to those skilled in the art that the above embodiment of the invention is not a unique solution, and other variants of film thickness, layer number, and refractive index may be suitably optimised to give an overall half-wave phase retardation. Alternative solutions may be derived theoretically or optimised experimentally by those suitably skilled in the art. The coatings, for example, need not necessarily be identical on each of the totally internally reflecting surfaces, and in other embodiments, one or both metallised surfaces or the entry and exit surfaces may be provided with suitably optimised coatings.

By appropriate selection of layer materials and thickness, other values of retardation can be duly achieved.

Furthermore, the invention is not limited to Pechan rotators. Alternative optical rotators, such as Dove, Schmitt, Vee-block or Abbe types, may be modified in similar fashion i.e. by the application of suitably optimised multi-layer films to one or more reflecting surfaces in order to provide overall 180° phase retardation, preferably associated with suitable anti-reflective properties.

It will be further apparent to those skilled in the art that the use of the invention is not limited to optical recording devices. The invention may be suitably used in any optical system where it is required to rotate an image of a fixed object source about an axis and in which it is advantageous for any state of polarisation present in the incident light beam to be rotated with the image.

The terms "optical" and "light" as used herein are not intended to be limited to visible radiation but instead are intended to embrace other forms of electromagnetic radiation, such as infra-red radiation for example, which can be handled, insofar as the invention is concerned, in the same way as visible radiation.

I claim:

1. An optical image rotating device comprising an input surface, a plurality of reflective surfaces for reflecting light entering the device through said input surface, at least one of said reflective surfaces bearing a layered polarizing material, and the device also comprising an output surface, the layered polarizing material being arranged to impose a predetermined polarization effect between light entering the device at said input surface and leaving the device at said output surface, the device being rotatable, the optical axes of the input and output beams being parallel with the axis of rotation of the device.

2. A device according to claim 1 whereby the layered polarising material comprises a plurality of layers of optically transmissive thin films.

3. A device according to claim 2 whereby said films are of silicon oxide.

4. A device according to claim 1 whereby said predetermined polarisation effect comprises a total phase retardation of substantially 180° between the "p" and "s" polarisation components of said light.

5. A device according to claim 1 whereby said input and output surfaces are disposed substantially orthogonally to an axis about which said device is rotatable.

6. A device according to claim 1 whereby total internal reflection of said light occurs at the surface, or at least one of the surfaces, bearing said layered polarising material.

7. A device according to claim 1 comprising a Pechan rotator.

8. A device according to claim 7 whereby said rotator comprises first and second prisms separated by an air gap and configured to cause light entering through said input surface to undergo a total of five reflections before emerging from said output surface.

9. A device according to claim 8 whereby said reflections comprise alternate total internal reflections and mirror reflections and a transit through the gap between prisms at substantially normal incidence to the two spaced prism surfaces.

10. A device according to claim 9 whereby all three of the surfaces of said prisms at which total internal reflection occurs bear respective layers of polarising material.

11. A device according to claim 1 whereby the nominal wavelength of light to be rotated is $\lambda$, the refractive index of the light is 1.76, and said surface bearing a layered polarising material is provided with five layers of such material as follows:

| Layer | Thickness of Layer | Refractive Index of Layer |
|-------|-------------------|---------------------------|
| 1 | $\lambda/4$ | 1.86 |
| 2 | $\lambda/2$ | 1.76 |
| 3 | $\lambda/4$ | 1.50 |
| 4 | $\lambda/4$ | 1.62 |
| 5 | $\lambda/4$ | 1.51 |

* * * * *